June 13, 1950  N. IVANOVIC  2,510,979
VIBRATION INSULATOR
Filed May 21, 1946

INVENTOR.
NICHOLAS IVANOVIC.
BY
ATTORNEY

Patented June 13, 1950

2,510,979

UNITED STATES PATENT OFFICE 2,510,979

VIBRATION INSULATOR

Nicholas Ivanovic, Philadelphia, Pa.

Application May 21, 1946, Serial No. 671,337

8 Claims. (Cl. 248—358)

(Granted under the act of March 3, 1883, as amended April 30, 1928; 370 O. G. 757)

This invention pertains to the art of mounts for engines, machines, etc., and the invention is embodied in a shock absorbing mount that provides insulation against vibration.

The balancing of a machine is seldom perfect and in the operation of the machine there may exist a certain amount of unbalance which will result in disturbing forces producing vibrations. In order to reduce the effect of the disturbing forces on the fixed machine support, the device of the present invention is adapted to prevent the transmission of the vibrations to the support. Were the machine rigidly attached to the fixed support, the entire disturbing force would be transmitted to the fixed support. By introducing vibration absorbers between the machine and the support, a substantial reduction in the force transmitted to the support may be obtained.

To accomplish the purposes described hereinbefore, it is necessary to incorporate a spring rate in the vibration absorbers such that the natural frequency of the machine mounted on the vibration absorbers will be small in comparison with the frequency of the disturbing force. The spring rate as here employed and as conventionally defined is the slope of the load-deflection curve for a vibration absorber.

In addition to the incorporation of a suitable spring rate, it is desirable to include a measure of damping in the vibration absorber, the damping serving to reduce the amplitude of vibration at resonance.

Aside from the design problems associated with the incorporation of the proper spring rate and damping characteristics, the actual design of a vibration absorber frequently offers difficulties because of space limitations, the difficulties arising from the fact that the absorber must be strong enough to transmit the machine load to the fixed support and at the same time be flexible enough to make the natural frequency of the machine mounted on the absorbers small in comparison with the frequency of the disturbing force. Other difficulties arise from the necessity for adequately protecting the vibration absorption elements from weathering deterioration in service.

It is accordingly among the objects of my invention to provide a vibration and shock absorbing assembly which will have a predetermined and controllable spring rate.

A further object of my invention is to provide a device which will limit the amount of deflection between the supporting member and the floating object.

Another object is to provide a device which will incorporate vibration damping means.

Another object is to provide a device adaptable for use over a wide range of vibration frequencies and where the amplitude of vibration is high.

A further object is to devise an assembly that is inherently stable for loads applied in any direction.

A further object is to construct a device which is light in weight, small in size, water and moisture shedding, well ventilated for the dissipation of the frictional heat developed and is of simple design and easy to manufacture.

These and other objects of the invention and the various features and details of construction and operation thereof will be apparent from the specification as hereinafter more fully set forth and described, and from the drawings, in which.

Figure 1:
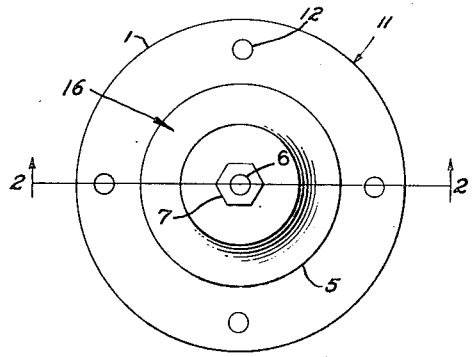
Fig. 1 is a plan view of one embodiment of the invention.

The shock-absorbing mount of the present invention comprises the base, generally designated 11, that includes the flange 1 of annular construction. The flange embodies fasteners for fixedly attaching the base 11 to some rigid object the fasteners, in the construction shown, comprising the holes 12 that are adapted to receive bolts or the like suitable attaching devices.

The base 11 embodies the truncated projections 15 that extend in opposite directions away from the plane of the flange 1, the projections 15 being contoured symmetrically opposite, and preferably disposed coaxially. Each projection 15 comprises the exterior conical surface 2, the upright wall of which describes a predetermined angle with reference to the plane of the flange 1. At its end remote from the flange 1, each projection 15 is flared at 3, for a purpose to be described hereinafter.

A floating member, generally designated 16, is provided companion to the base 11. The floating member 16 comprises a pair of cups 5, each companion to one of the several projections 15 of the base 11, and each comprising an internal conical surface 17 that is adapted to lie in opposed relationship to the exterior conical surface 2 of its companion projection 15. In the disclosed embodiment, the angles described by the opposed external and internal conical surfaces 2 and 17 are the same.

One or more toroid rings 4 of resilient material, such as rubber or the like, are provided to be positioned between each set of exterior and interior surfaces 2 and 17, and in bearing engagement with each, the dimensions of each ring being predetermined to locate the ring in predetermined position along the opposed conical surfaces, and also to predetermine the spacing between opposed exterior and interior conical surfaces 2 and 17 respectively. The flared end 3 of the projection 15 serves as a stop or dam to prevent the ring 4 from escaping over the end of the conical surface 2, and out of abutting engagement with and between the opposed surfaces 2 and 17.

The truncated end of each cup 5 is provided with a disc-like web 18 that serves in assembling the floating element 16. A spacer 8 is provided of predetermined length to predetermine the distance between cups 5, and accordingly to predetermine the spacing between opposed exterior and interior conical surfaces 2 and 17 respectively. The length of the spacer 8 determines the extent to which the rings 4 are compressed. Bolts 6 are provided, one threaded into each of opposite ends of the spacer 8, and the nuts 7 hold the end webs 18 of respective cups 5 clamped against respective opposite ends of the spacer 8. The bolts 6 also serve as an attachment for the engine or machine to the mount of the present invention.

Compressive action on the assembly of the floating element 16 against the base 11 acting through the resilient rings 4 causes a flattening action of the rings 4, and a rolling or torsional action to be set up in the annular toroid shaped rings 4, as they roll between the conical surfaces 2 and 17. An additional alternately stretching and contracting motion is set up in the annular toroid shaped rings 4 as their diameters change consistent with their travel up or down between the surfaces 2 and 17.

The interposing of the elastic rings 4 between the opposing surfaces 2 and 17 which are coaxially positioned, results in essentially a spring element which can be loaded in any direction. The spring rate, or spring constant is determined by (1) the durometer hardness of rings 4; (2) physical size and shape (configuration) of rings 4, either in cross-sectional area or in the diameter of the torus; (3) angle of taper of conical surfaces 2 and 17 with respect to the axis of bolt 6; (4) the initial compression of the rings 4, as determined by the relative length of spacer 8, as the assembly is drawn up on bolt 6 by nut 7; (5) number of torus rings used, from the two, shown in Fig. 2, to four or more, not shown, depending on the load, shock or vibration conditions involved; and (6) the initial tension of the rings 4, as determined by difference in diameters of ring in free condition; unassembled between surfaces 2 and 17, and the minimum diameter of necked section of the projection 15 at the position between its flared end 3 and conical surface 2. By adjusting or changing any of the six variables listed, it is possible to adjust or change the spring rate of the vibration absorber over a wide range. The circular cross-section of the flexible torus rings 4 results in a vibration absorber having non-linear deflection characteristics.

Damping of the vibration absorber results from the friction losses and the various distortions and displacements suffered by the annular rings 4, as described above, when the vibration absorber is loaded. Energy is absorbed due to the hysteresis in the material of rings 4 as the rings are distorted and displaced and is dissipated in the form of heat. The open structure of my device permits proper ventilation of the rings 4 and ready dissipation of this heat, as well as of the heat due to friction. The open structure of my device also permits ventilation of any moisture which may have collected in or around the elements of the vibration absorber.

In my invention, the various parts are arranged so that relatively large motions can occur between cups 5 and their respective companion projections 15 before these two metal parts come in contact, or "bottom," permitting my device to absorb vibrations of relatively large magnitudes.

Under preferred practice, each base 11 and the cups 5 are constructed of sheet metal. This enables the several piece parts to be constructed easily and at low cost using conventional production machines and methods, and enables the efficient dissipation of heat generated by relative motion between the base 11 and the floating element 16. The base can be constructed of two pieces as shown, preferably joined by welding or any other suitable process, to form the flange 1. Preferably the ends of the projections are open as at 9 for air flow to dissipate heat.

Figure 2:
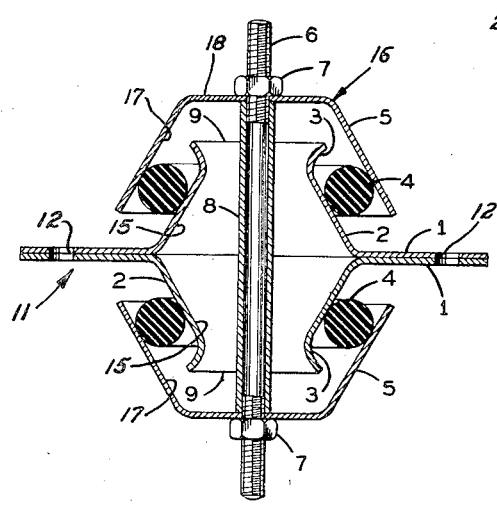
Fig. 2 is a cross-sectional elevation, taken on line 2—2 of Fig. 1.
Figure 3:
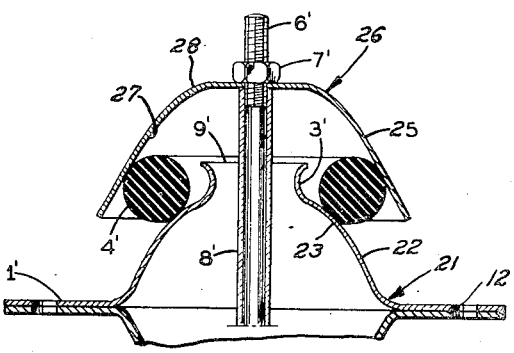
Figs. 3 and 4 are cross-sectional elevations similar to Fig. 2 but with parts broken away, illustrating respective modified forms of the invention.
Figure 4:
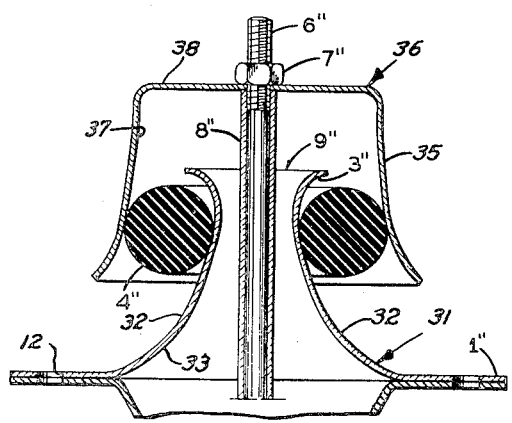

Figs. 3 and 4 illustrate modifications of the structure in Fig. 2, the showing in each instance being fragmentary. In each of Figs. 2 and 4, only the top half of the device is shown, the bottom half being constructed symmetrically opposite.

In the embodiment of Fig. 3, the base 21 comprises the flange 1, that includes the fasteners 12 as in the embodiment of Fig. 2. The base 21 also comprises the truncated projections 23, that extend away from the flange 1 in opposite directions from the plane thereof, as in the embodiment of Fig. 2. The exterior surfaces 22 of projections 23 differ from the conical contour of Fig. 2 in that their profiles in elevation are convexly curved. By means of this construction, the toroid ring 4, that is structurally the same as the like ring 4 in the embodiment of Fig. 2, encounters increased circumference that increases in diminishing increments, towards the base of the truncated projection 23 are like the projections 15 of Fig. 2, and they comprise the flared ends 3 and the openings at the end at 9.

The floating element 26 of Fig. 3 comprises the cups 25 that are similar to the cups 5 of Fig. 2, but differ in that the interior surfaces 27 thereof describe a concave curvature in elevation profile to conform with the convex curvature of the exterior surfaces 22 of their respective companion projections 23. In other particulars, the cups 26 are like the cups 5, and they comprise the end webs 28 that serve the same purpose as the end webs 18 of the embodiment of Fig. 2 for assembling the floating member 26.

The embodiment of Fig. 4 differs from the embodiment of Fig. 2 in the opposite manner from Fig. 3. The base 31 of Fig. 4 comprises the truncated projections 33, each with an exterior surface 32 having a concave profile in elevation, and each companion cup 35 of the floating element 36 has a convex interior surface 37 in elevation profile to conform with its companion concave surface 32. The base 31 includes the flange 1 and its holes 12 that are the same as in the other embodiments of Figs. 2 and 3, and each projection 33 includes the flare 3 and the opening 9 at its truncated end. The structure of the toroid ring 4 is like that of other embodiments of Figs. 2 and 3, and the cup 35 is provided with the web 38 at its truncated end.

It will be understood that the base 21 of Fig. 3, and the base 31 of Fig. 4, comprises two pieces of sheet metal with flange 1 being formed by the two pieces being joined together by welding or other suitable process, as in the embodiment of Fig. 2. Likewise, the floating element 26 of Fig. 3, and the floating element 36 of Fig. 4, each comprises two sheet-metal cups 25 and 35 respectively, each cup being companion to a projection 23 or 33 respectively, and the several cups 23 or 33 of the respective embodiments being connected by the spacer 8, bolts 6 and nuts 7, in the same manner as in the embodiment of Fig. 2.

The modifications of Figs. 3 and 4 provide each a controlled spring rate that differs from the spring rate of Fig. 2 and that differ from each other. In general, reduction of the angle of cup surfaces with an angle taken through the center of bolt 6 will decrease the slope of the load deflection curve, resulting in a decreased spring rate or "softer" vibration absorber, and vice versa.

While particular embodiments of my invention have been illustrated and described herein, it is not intended that the invention be limited to such disclosures, and changes and modifications may be made therein and thereto within the scope of the appended claims.

The invention described herein may be manufactured and used by or for the Government of the United States of America for governmental purposes without the payment of any royalties thereon or therefor.

What I claimed is:

1. In a shock-absorbing mount, a base comprising a pair of projections extending away from each other, each projection embodying a truncated pyramidal exterior surface, a floating member supported by the base and comprising a cup for each projection, each cup comprising an interior surface disposed opposite and companion to an exterior surface, a toroid ring of resilient material positioned between each companion set of exterior and interior surfaces in bearing engagement with each, a connector between the cups holding them with their interior surfaces spaced apart a predetermined distance to predetermine the spacing between companion exterior and interior surfaces.

2. In a mount as defined in claim 1 an adjustment for the spacing between cups to control the resiliency of the resilient ring.

3. In a shock-absorbing mount, a base comprising a pair of projections extending away from each other, each projection embodying a truncated pyramidal exterior surface, a floating member supported by the base and comprising a cup for each projection, each cup comprising an interior surface disposed opposite and companion to an exterior surface, a toroid ring of resilient material positioned between each companion set of exterior and interior surfaces in bearing engagement with each, the exterior surface of each projection being flared at its truncated end to hold the ring thereof in engagement therewith, a connector between the cups holding them with their interior surfaces spaced apart a predetermined distance to predetermine the spacing between companion exterior and interior surfaces.

4. In a shock-absorbing mount, a base comprising a pair of projections extending away from each other, each projection embodying a truncated pyramidal exterior surface with a curved profile in elevation, a floating member supported by the base and comprising a cup for each projection, each cup comprising an interior surface disposed opposite and companion to an exterior surface, a toroid ring of resilient material positioned between each companion set of exterior and interior surfaces in bearing engagement with each, a connector between the cups holding them with their interior surfaces spaced apart a predetermined distance to predetermine the spacing between companion exterior and interior surfaces.

5. In a shock-absorbing mount, a base comprising a pair of projections extending away from each other, each projection embodying a truncated pyramidal exterior surface with a profile in elevation that is curved convex, a floating member supported by the base and comprising a cup for each projection, each cup comprising an interior surface disposed opposite and companion to an exterior surface, a toroid ring of resilient material positioned between each companion set of exterior and interior surfaces in bearing engagement with each, a connector between the cups holding them with their interior surfaces spaced apart a predetermined distance to predetermine the spacing between companion exterior and interior surfaces.

6. In a shock-absorbing mount, a base comprising a pair of projections extending away from each other, each projection embodying a truncated pyramidal exterior surface with a profile in elevation that is curved concave, a floating member supported by the base and comprising a cup for each projection, each cup comprising an interior surface disposed opposite and companion to its exterior surface, a toroid ring of resilient material positioned between each companion set of exterior and interior surfaces in bearing engagement with each, a connector between the cups holding them with their interior surfaces spaced apart a predetermined distance to predetermine the spacing between companion exterior and interior surfaces.

7. In a shock-absorbing mount, a base comprising two pieces of sheet metal each formed to constitute an annular flange and a projection embodying a truncated pyramidal exterior surface, the flanges of the two pieces being positioned in surface to surface contacting engagement with their projections extending away from each other, a floating member comprising two pieces of sheet metal cupped to embody each an interior surface companion to the exterior surface of the projection, the cupped pieces of the floating member each being positioned with its interior surface disposed opposite to its companion exterior surface, a toroid ring of resilient material positioned between each set of companion exterior and interior surfaces in bearing engagement with each, a connector between the cupped pieces holding them with their interior surfaces spaced apart a predetermined distance to predetermine the spacing between companion exterior and interior surfaces.

8. In a shock-absorbing mount, a base comprising two pieces of sheet metal each formed to constitute an annular flange and a projection embodying a truncated pyramidal exterior surface, the projection being open at the truncated end of the exterior surface, the flanges of the two pieces being positioned in surface to surface contacting engagement with their projections extending away from each other, a floating member comprising two pieces of sheet metal cupped to embody each an interior surface companion to the exterior surface of the projection, the cupped pieces of the floating member each being positioned with its interior surface disposed opposite to its companion exterior surface, a toroid ring of resilient material positioned between each set of companion exterior and interior surfaces in bearing engagement with each, a connector between the cupped pieces extending through the open ends of the projections and holding the cupped pieces with their interior surfaces spaced apart a predetermined distance to predetermine the spacing between companion exterior and interior surfaces.

NICHOLAS IVANOVIC.

REFERENCES CITED

The following references are of record in the file of this patent:

| Number | Name | Date |
|---|---|---|
| 2,162,714 | Hamblin | June 20, 1939 |
| 2,322,844 | Goldschmidt | June 29, 1943 |

FOREIGN PATENTS

| Number | Country | Date |
|---|---|---|
| 499,232 | Great Britain | Jan. 20, 1939 |
| 823,517 | France | Oct. 18, 1937 |
| 829,524 | France | Apr. 5, 1938 |